United States Patent
Koch et al.

(10) Patent No.: US 10,568,464 B2
(45) Date of Patent: Feb. 25, 2020

(54) BENDABLE STRAINER

(71) Applicant: DRYCAN SOLUTIONS 2015 LTD., Tel Aviv (IL)

(72) Inventors: Matan Koch, Tel Aviv (IL); Gal Argaman, Tel Aviv (IL)

(73) Assignee: DRYCAN SOLUTIONS 2015 LTD., Tel Aviv (IL)

( * ) Notice: Subject to any disclaimer, the term of this patent is extended or adjusted under 35 U.S.C. 154(b) by 116 days.

(21) Appl. No.: 15/310,755

(22) PCT Filed: May 12, 2015

(86) PCT No.: PCT/IL2015/050496
§ 371 (c)(1),
(2) Date: Nov. 12, 2016

(87) PCT Pub. No.: WO2015/173810
PCT Pub. Date: Nov. 19, 2015

(65) Prior Publication Data
US 2017/0071414 A1  Mar. 16, 2017

Related U.S. Application Data

(60) Provisional application No. 61/992,237, filed on May 13, 2014.

(51) Int. Cl.
*A47J 43/28* (2006.01)
(52) U.S. Cl.
CPC .................. *A47J 43/286* (2013.01)
(58) Field of Classification Search
None
See application file for complete search history.

(56) References Cited

U.S. PATENT DOCUMENTS

| | | | |
|---|---|---|---|
| 1,822,138 A * | 9/1931 | Fricke | B65D 81/22 220/578 |
| 2,136,755 A * | 11/1938 | Prince | A47G 19/2211 210/464 |
| 2,393,420 A * | 1/1946 | Scheuplein | A47J 36/20 99/403 |
| 5,059,319 A | 10/1991 | Welsh | |
| D361,697 S | 8/1995 | McNaughton | |
| 5,706,721 A | 1/1998 | Homes | |
| D467,472 S | 12/2002 | de Vries | |
| D485,136 S | 1/2004 | Golden et al. | |
| 6,789,683 B1 | 9/2004 | Fisher | |

(Continued)

FOREIGN PATENT DOCUMENTS

FR  2713209 A1  6/1995

OTHER PUBLICATIONS

International Search Report for PCT/IL2015/050496, dated Aug. 30, 2015.
Written Opinion for PCT/IL2015/050496, dated Aug. 30, 2015.

*Primary Examiner* — Benjamin M Kurtz
(74) *Attorney, Agent, or Firm* — FisherBroyles, LLP; Robert Kinberg

(57) ABSTRACT

The invention relates to a strainer for a food container that comprises apertures suitable for allowing liquids to drain therethrough, which is provided with at least two holes through which two fingers of a user can be inserted to a level below the strainer's plane, said strainer being bendable by the action of forces applied by said fingers.

7 Claims, 2 Drawing Sheets

(56) References Cited

U.S. PATENT DOCUMENTS

| | | |
|---|---|---|
| D497,524 S | 10/2004 | Marsden et al. |
| D633,347 S | 3/2011 | Boris |
| 8,016,122 B2 | 9/2011 | Coudurier et al. |
| D754,469 S | 4/2016 | Deters |
| D762,017 S | 7/2016 | Tsengas |
| 9,394,087 B2 * | 7/2016 | Phillips ................ B65D 47/12 |
| D790,489 S | 6/2017 | Toyomura et al. |
| 2005/0161396 A1 * | 7/2005 | Chaput ................ A47J 43/284 |
| | | 210/464 |
| 2017/0071414 A1 | 3/2017 | Koch et al. |

* cited by examiner

BENDABLE STRAINER

FIELD OF THE INVENTION

The present invention relates to the field of food containers. More particularly, the invention relates to a strainer, particularly suited for incorporation into a sealed food container or for the addition to an open container, suitable to drain liquids therefrom.

BACKGROUND OF THE INVENTION

Many types of food are stored in cans that allow it to be stored for a relatively long period of time. The storage of food in cans prevents oxygen from coming in contact with the food, thus avoiding spoiling of the food by the action of bacteria and thus postponing its expiration date. Over the years, the use of cans for food storage has increased, since the prolongation of shelf life is very desirable for both manufacturers and buyers.

The containers are usually filled with liquid, suitable to preserve the food, such as oil, vinegar, or any other liquid that maintains the freshness of the stored food. Food-preserving additives may also be dissolved in the liquid.

When opening liquid-comprising cans, it is sometime difficult to separate the liquid from the stored food, especially when the food is of small dimensions, for example, if the food is corn seeds, they can be accidentally spilled when pouring the liquid out of the can, and if the liquid is not poured out, it can be unhygienic and inconvenient to reach the stored food.

According to the prior art, there are can strainers that are used for the purpose of draining liquids, but they present problematic designs that do not provide a convenient use of the device. For example, U.S. Pat. No. 5,706,721 describes a food can strainer installed within a can, comprising a substantially planar structure, having holes spaced over substantially the entire planar surface. Using a planar surface may be appropriate for the sole purpose of draining liquids, but it is rather inconvenient when trying to remove the strainer from a can to get to the food stored therein.

Therefore, it is an object of the present invention to provide a device suitable to be used to drain liquids from food cans, or from any other liquid-comprising containers.

It is another object of the invention to provide a strainer that is structurally suitable to be easily pulled out of a can or any other container.

Other objects and advantages of the invention will become apparent as the description proceeds.

SUMMARY OF THE INVENTION

The invention relates to a strainer for a food container, such as food cans, that comprises apertures suitable for allowing liquids to drain therethrough, which is provided with at least two holes through which two fingers of a user can be inserted to a level below the strainer's plane, said strainer being bendable by the action of forces applied by said fingers. The diameter of a strainer is reduced when said force is applied, thus providing an easy insertion and/or removal of the strainer into/from a can.

The strainer can be made of a flexible material, but a degree of flexibility can also be provided by including structural flexibility in the design of the strainer. Structural flexibility can be provided by a groove located on the surface of the strainer, or by a line of reduced material thickness that will weaken the material in a specific direction.

The holes of a strainer can be sealed by capping covers for comfortable placement of the fingers of the user and to prevent the fingers from extending too much into the food can. In addition, the holes of a strainer are located far enough from the edges of the strainer, providing a safe use of the device, without the danger of injuries that can be inflicted by accidentally touching the sharp edges of an open can.

BRIEF DESCRIPTION OF THE DRAWINGS

The invention will be further illustrated with reference to the appended drawings, wherein.

DETAILED DESCRIPTION OF THE INVENTION

The following description illustrates the invention by reference to strainers for round food cans, but the device of the invention can also be used for draining liquids from any type of liquid-comprising containers of all shapes and sizes, which are not exemplified, for the sake of brevity, since they can easily be understood by a person skilled in the art from the description of round examples.

Figure 1A:
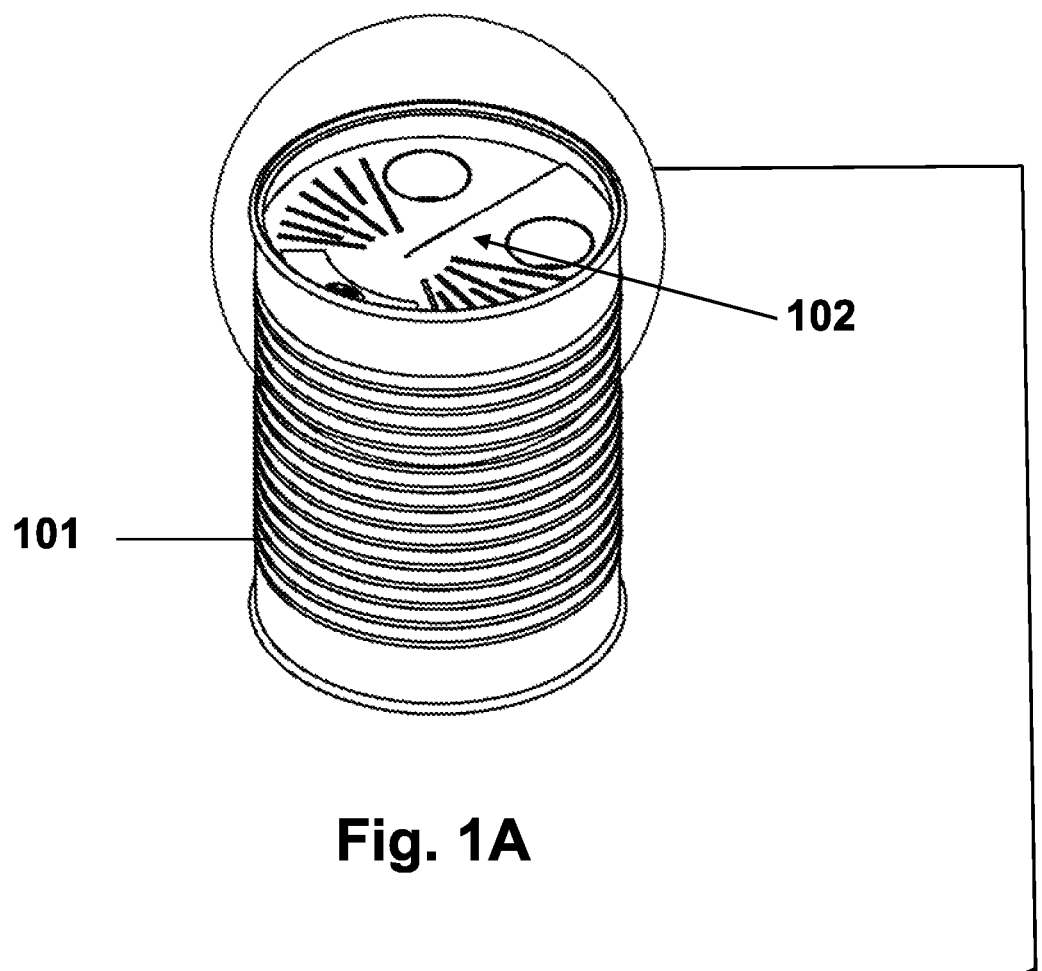
FIG. 1A is a perspective view of a can provided with a strainer, according to one embodiment of the invention.

FIG. 1A is a perspective view of a can 101, which is provided with a strainer 102, according to one embodiment of the invention. Strainer 102 can be provided inside closed cans, such as can 101, or it can be positioned inside cans after opening them. Strainer 102 can also be reused for draining liquids from additional cans. Can 101 can be replaced with other types and shapes of containers, and strainer 102 can be of any shape with outlines that are suited for the inner shape of said cans.

Figure 1B:
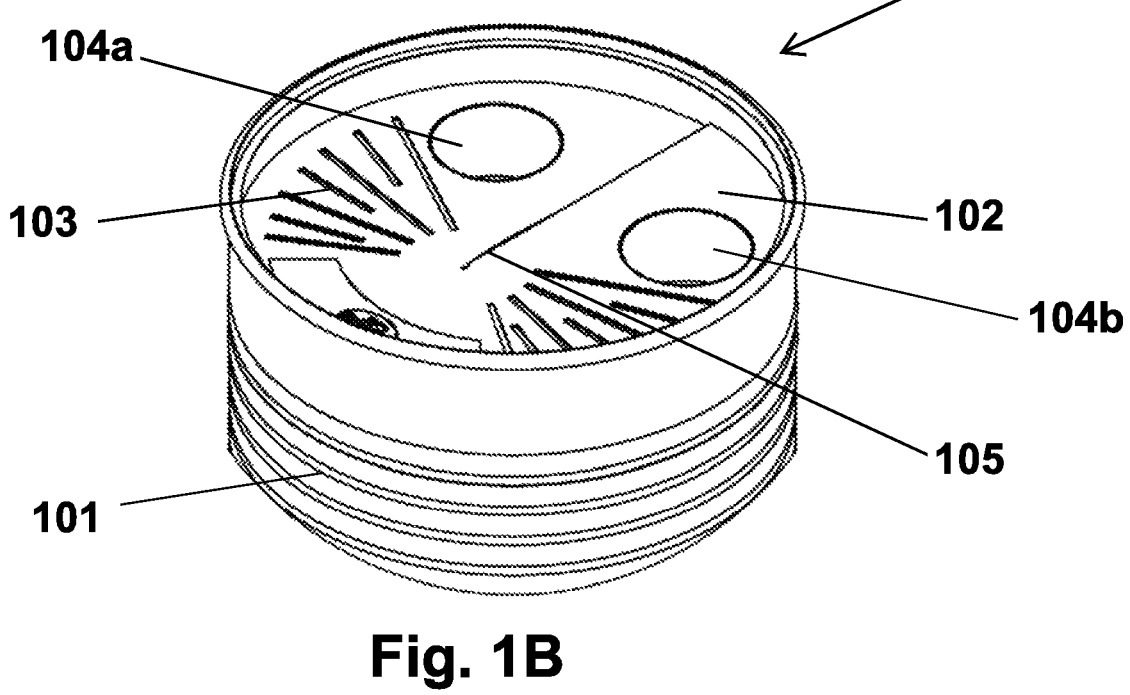
FIG. 1B is an enlarged view of the top section of the can of FIG. 1A.

FIG. 1B is an enlarged view of the top section of can 101 of FIG. 1A, showing the shape of strainer 102, which comprises apertures in the shape of slits 103, holes 104a and 104b, and groove 105. Slits 103 are suitable to allow only the fluids that are inside can 101 to run through them, thus straining the fluids from can 101. Slits 103 can be replaced by any shape that can provide the straining of fluid through them, such as round holes, or straight or curved slits, and they can be evenly or unevenly scattered on the surface of the strainer. Slits 103 can also be replaced with slits that are shaped as a logo or as other shapes that provide marketing value. Holes 104a and 104b can also be provided with slits.

The diameter of strainer 102 is essentially equal to the inner diameter of can 101, so it would not move unless an external force is applied. When a user wishes to place or remove strainer 102 from can 101 he can place two fingers inside holes 104a and 104b, one finger in each hole, and apply pressure that can slightly bend strainer 102 along groove 105, which is provided for an easy insertion and/or removal of strainer 102 into/from can 101. Holes 104 (a and b) are conveniently shown as round in shape, but they can be of any other suitable shape (e.g., elliptic), as long as they comfortably accommodate a user's fingers.

The bending of a strainer can be performed if the material of the strainer is slightly flexible, or if the strainer comprises a groove, such as groove 105 of strainer 102 of FIG. 1B. When placing two fingers inside holes 104a and 104b and applying pressure in each finger (e.g., in a direction that would ideally bring both fingers one toward the other), groove 105 closes and the diameter of strainer 102 is reduced in one direction, thus providing an easy insertion and/or removal of strainer 102 into/from can 101. If the material of strainer 102 is very flexible, for instance if it is made of soft plastic material, it is possible to bend it without providing a groove 105, because holes 104a and 104b allow applying relatively strong bending forces. It may also be possible to replace groove 105 with a line of reduced material thickness that will weaken the material in a specific direction, thus facilitating bending, e.g., when the strainer is flexible enough or disposable.

Figure 2A:
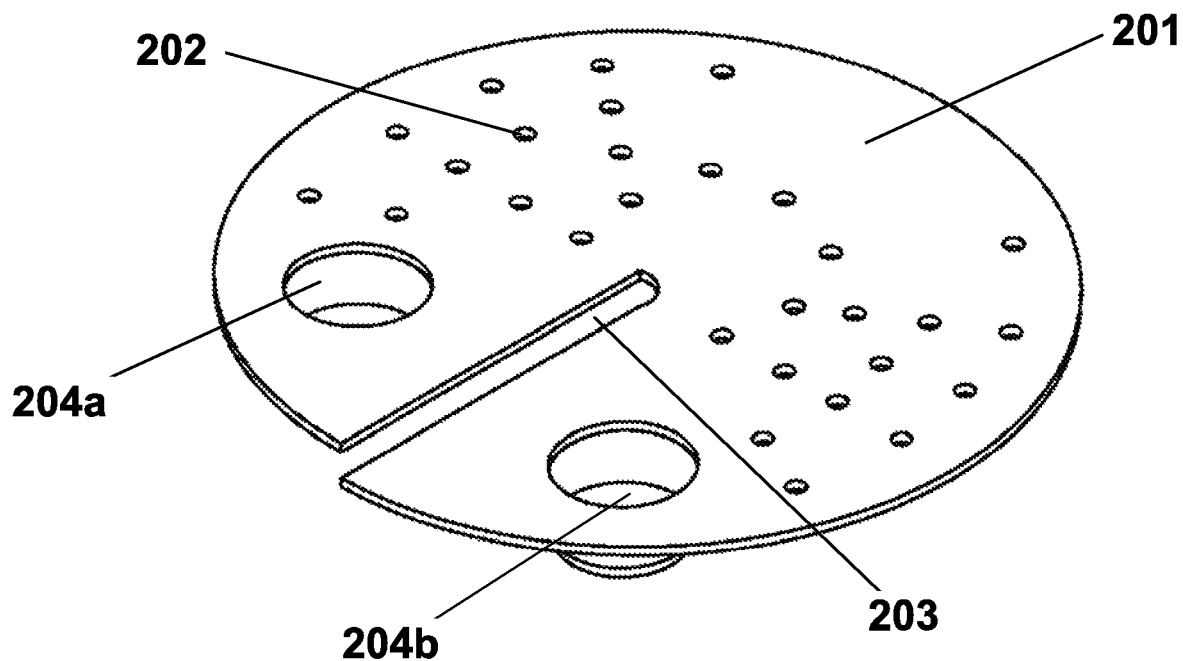
FIG. 2A is a perspective view of a strainer, according to a second embodiment of the invention.

FIG. 2A is a perspective view of another strainer 201, according to a second embodiment of the invention, provided with round apertures 202 that are randomly scattered on the surface of strainer 201. Cans can be provided with strainers when they are filled with food products, and the apertures of each type of strainer can be designed for the specific food that is stored in each can. For instance, small apertures such as round holes 202 can be suitable for food that comes in small pieces.

FIG. 2A also shows a groove 203, and another set of two holes (i.e., "handling holes") 204a and 204b. Like holes 104a and 104b, handling holes 204a and 204b are provided for the same purpose of placing two fingers in the strainer and applying pressure, thus causing the bending of strainer 201 and providing for an easy placement and/or displacement thereof.

Figure 2B:
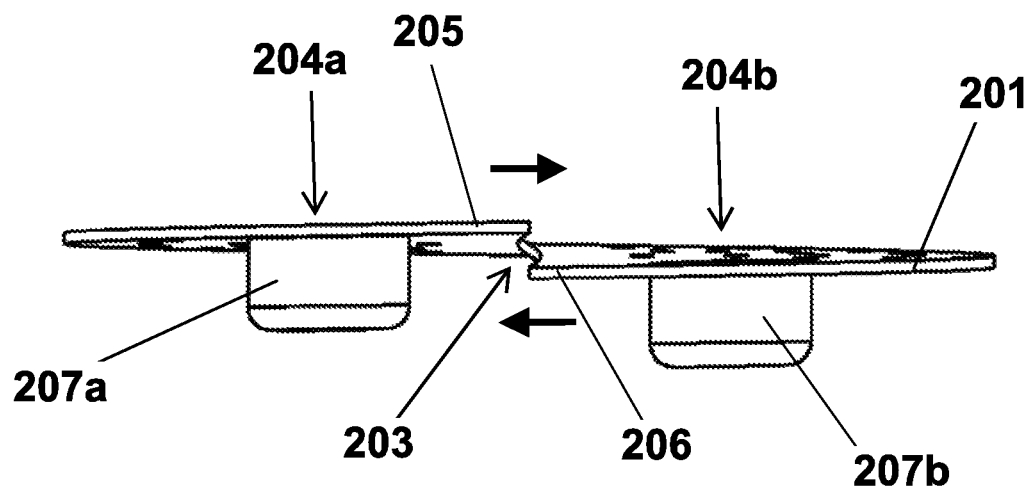
FIG. 2B is a front view of the strainer of FIG. 2A.

FIG. 2B is a front view of strainer 201 of FIG. 2A (which also illustrates the front view of strainer 101 of FIG. 1). The user can push one side down and create a height difference between the two sides 205 and 206 of strainer 201 that are close to groove 203, as illustrated in the figure, using the flexibility of strainer 201 that is formed by groove 203 to bend strainer 201. Bending can take place in different directions, such as by forcing holes 204a and 204b to lay on different planes, as seen in FIG. 2B, relative to groove 203, or simply by bending the strainer, particularly if no groove is provided. Holes 204a and 204b can be sealed by capping covers 207a and 207b for comfortable placement of the fingers of the user and to prevent the finger from extending too much into the food can.

Providing handling holes, such as holes 104 (a and b) and 204 (a and b) of FIGS. 1 and 2 respectively, together with the use of a flexible material or the design of a strainer that creates structural flexibility, provides a significant advantage over the prior art, and allows users to easily place and/or remove strainers from different containers. Although strainers of this type were suggested by the prior art, they could not find practical application in the industry until the present invention was made, because although they did fulfill the purpose of draining liquids, they were difficult to insert into, and remove from food containers. The handling holes provide an easy and intuitive way of handling the strainer and, even more so when provided with capping covers, make it surprisingly easy to apply forces in various directions, which allow the strainer to be bent in a desired direction with the application of very low forces. Thus, even an elderly person or a young child can operate the strainer and remove it with an ease never provided by the prior art.

Handling holes are also provided in a location that prevents the contact between the fingers of a user and the sharp edges of an open can, in which a strainer is provided. The insertion and/or removal of a strainer from a can, according to the invention, is performed not only very easily, but also very safely, in a way that prevents the user from getting injured by the sharp edges of a can, which is another advantage over the prior art.

All the above description has been provided for the purpose of illustration and is not meant to limit the invention in any way.

The invention claimed is:

1. A (102) strainer for a food container characterized in that it comprises a plurality of individual unconnected apertures (103, 202) scattered on the surface of the strainer, suitable for allowing liquids to drain therethrough, said strainer being provided with at least two holes (104a, 104b) through which two fingers of a user can be inserted to a level below a plane of the strainer, said strainer (102) being bendable by the action of forces applied by said fingers, thereby to place said strainer into or to remove said strainer from said food container; and wherein the holes are capped, with a cap integrally formed in the bottom portion of the strainer.

2. A strainer according to claim 1, wherein the strainer is made of a flexible material.

3. A strainer according to claim 1, wherein a degree of flexibility is provided to the strainer by including structural flexibility in the design of the strainer.

4. A strainer according to claim 3, wherein the structural flexibility is provided by a groove located on the surface of the strainer.

5. A strainer according to claim 1, wherein the containers are food cans.

6. A strainer according to claim 1, wherein the apertures are in the shape of slits (103).

7. A strainer according to claim 1, wherein the apertures are in the shape of round holes (202).

* * * * *